UNITED STATES PATENT OFFICE.

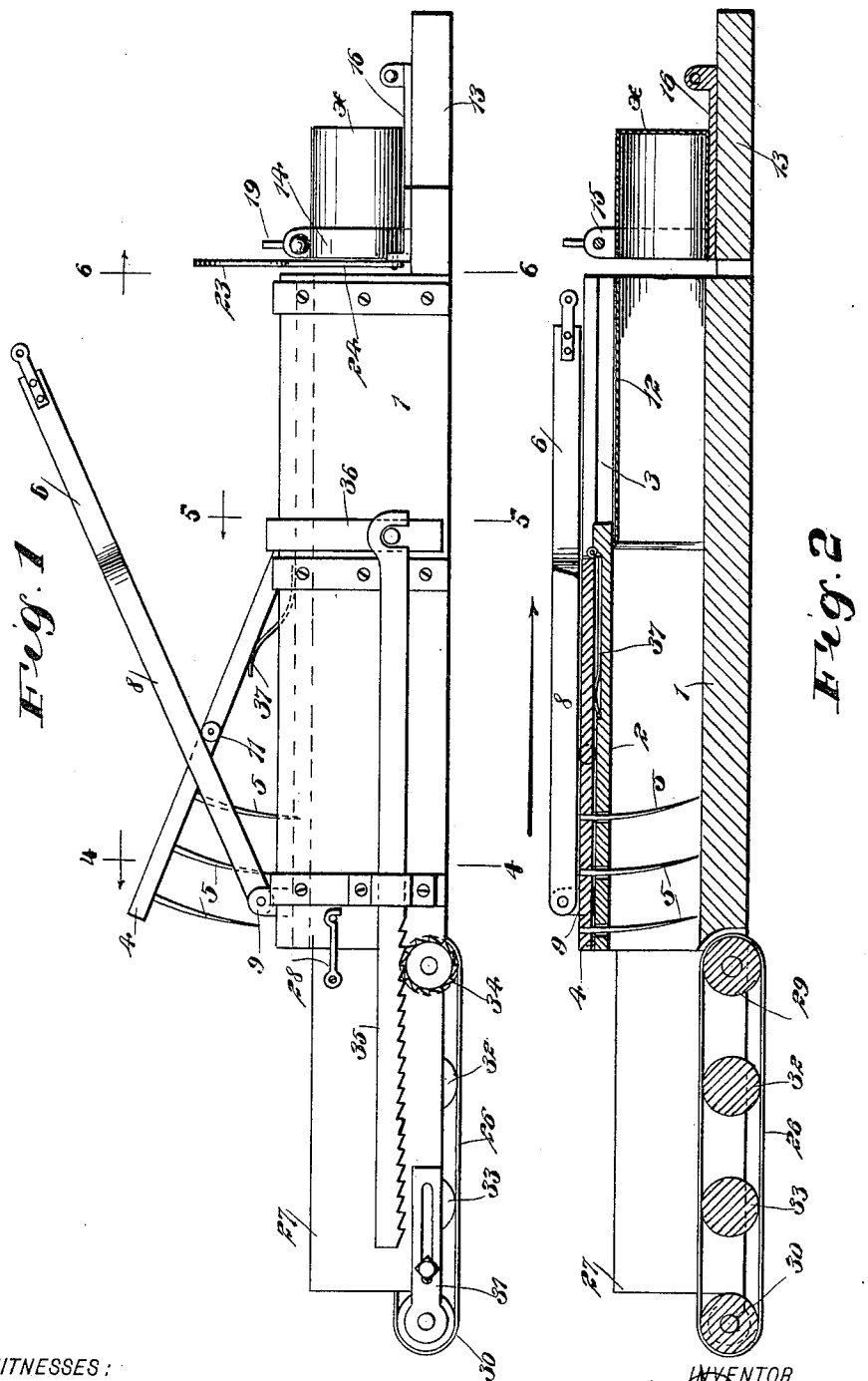

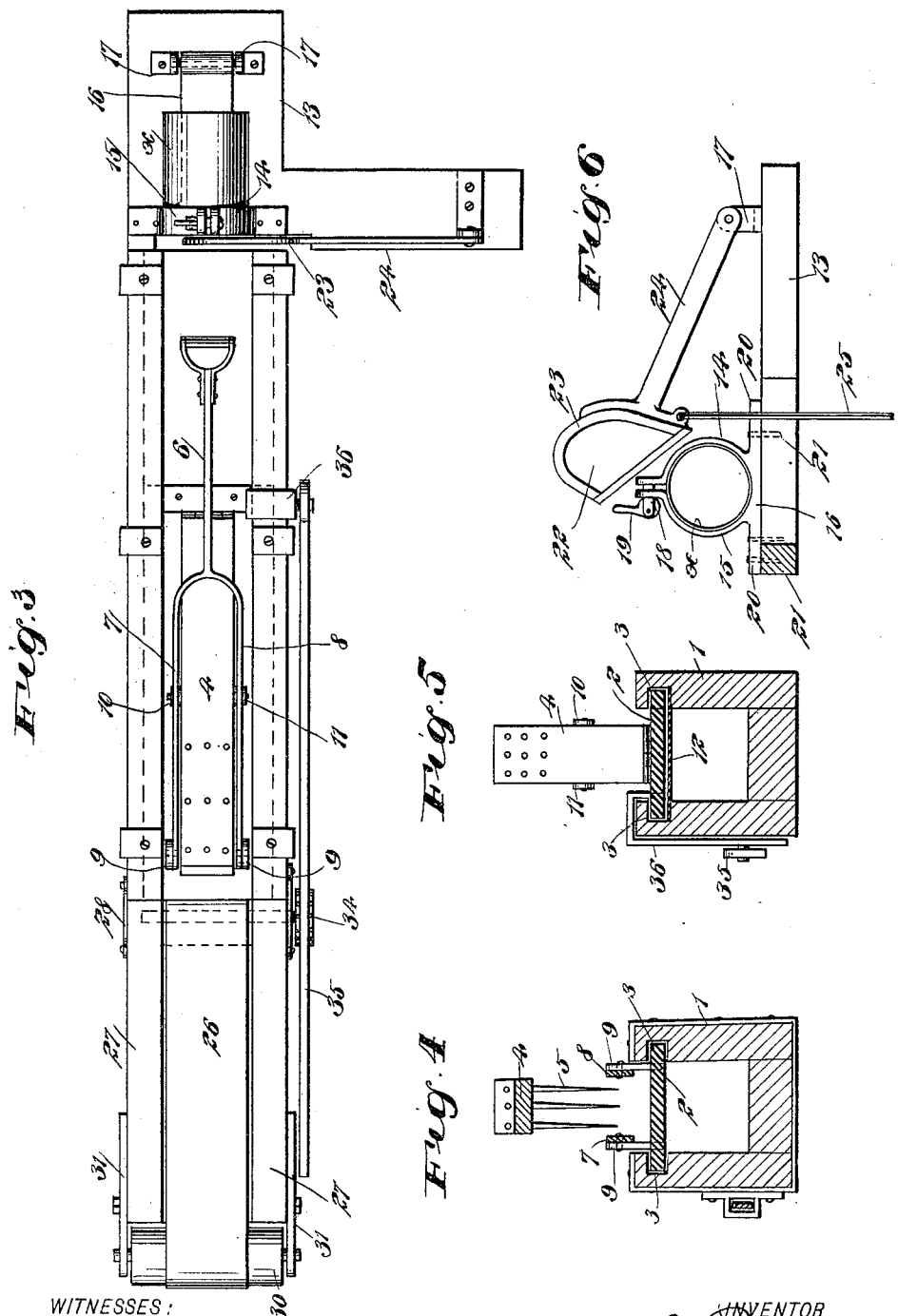

OREN RUBARTS, OF NEWPORT, OREGON.

CANNING-MACHINE.

SPECIFICATION forming part of Letters Patent No. 640,034, dated December 26, 1899.

Application filed August 18, 1899. Serial No. 727,673. (No model.)

*To all whom it may concern:*

Be it known that I, OREN RUBARTS, of Newport, in the county of Lincoln and State of Oregon, have invented a new and Improved Canning-Machine, of which the following is a full, clear, and exact description.

This invention relates to improvements in machines for canning meats, particularly salmon or other fish, in which the different parts of the meat are required to be combined in regular proportions in the can; and the object of the invention is to provide a simple machine by means of which the meat can be quickly forced into the cans in an unbroken condition and avoid the handling of the meat by numerous persons.

I will describe a canning-machine embodying my invention and then point out the novel features in the appended claims.

Reference is to be had to the accompanying drawings, forming a part of this specification, in which similar characters of reference indicate corresponding parts in all the figures.

Figure 1 is a side elevation of a canning-machine embodying my invention. Fig. 2 is a longitudinal section. Fig. 3 is a top plan view. Fig. 4 is a section on the line 4 4 of Fig. 1. Fig. 5 is a section on the line 5 5 of Fig. 1, and Fig. 6 is a section on the line 6 6 of Fig. 1.

The machine comprises a trough 1, open at its ends and having a longitudinally-sliding cover 2, which slides in channels 3, formed in the sides of the trough. Mounted to swing vertically on the cover 2 is a plunger-carrying plate 4, the plunger consisting, as here shown, of a number of teeth or prongs 5, secured to the plunger-carrying plate and adapted to move into the trough through perforations formed in the cover 2.

An operating handle or lever 6 has members 7 8 passing down on opposite sides of the plunger-carrier and pivotally connected to lugs 9 on the cover. The under sides of the members 7 8 of the handle bear, respectively, on rollers 10 11, mounted on the opposite edges of the plate 4. Stationarily arranged in the outlet end of the trough is a forming-tube 12, which forming-tube must be of the shape and size of the cans to be filled. I have here shown a round or cylindrical can $x$, and therefore the outlet end of the tube 12 should be of the same shape and have a diameter equal to the interior diameter of the can. The inner end of the tube, however, should fit tightly against the sides and bottom of the trough, and the upper side of its inner end should bear closely against the inner side of the cover 2, permitting the cover, however, to slide. By making these close connections at the inner end it is obvious that meat cannot be forced out to the outer side of the forming-tube.

Arranged on an extension 13 at the outlet end of the trough is a can-holding device, here shown as two clamping-jaws 14 and 15, which are mounted on a swinging plate 16, the said plate being mounted to swing on a rod supported by lugs 17 on the extension 13.

From the upper end of the clamping-section 14 a lug 18 extends loosely through an opening in the upper end of the clamping-section 15, and pivotally connected with this lug is an eccentric clamping-lever 19, adapted to bear against the clamping-section 15 and draw the two sections 14 15 tightly in connection with a can.

Extended from lateral projections 20 on the swinging plate 16 are pins 21, adapted to engage in holes in the extension 13 and prevent any possible lateral movement of the swinging plate when it is in its can-holding position. The object in mounting the clamp upon the swinging plate is to facilitate the washing or cleaning of the clamping device when necessary—that is, when such cleaning is required the plate may be swung upward.

There is a sufficient distance between the outlet end of the forming-tube and the adjacent side of the can-clamping device for the passage of a cutting-blade 22. This cutting-blade 22 is supported in a frame 23 on a lever 24, and it is to be operated by means of a treadle (not shown) and connected thereto by a rod 25. At the inlet end of the trough is an endless feeding-apron 26. This feeding-apron is shown as arranged between side pieces 27, detachably secured to the ends of the trough side pieces; but it is obvious that the side pieces 27 may be integral continuations of the trough side pieces without departing from the spirit of my invention. I have shown herein the side pieces 27 as detachably secured to the trough by means of hooks 28. The feeding-apron 26 is movable around rollers 29 and 30. The roller 29 has its shaft-bearings in the ends of the side pieces 27, adjacent to the trough 1, and the roller 30 has its shaft-bearings in the plates 31, adjustably connected to the side pieces at the inlet end. By making this adjustable connection it is obvious that the belt may be tightened or slackened, as required. If desired, supporting-rollers 32 33 may be arranged between the rollers 29 and 30, as plainly indicated in the drawings.

During the movement of the plunger toward the outlet end of the trough it is designed that the endless apron 26 shall be moved a distance corresponding to the movement of the plunger and simultaneously therewith. As a means therefor a ratchet-wheel 34 is attached to the shaft of the roller 29 and is engaged by a rack-bar 35, which at one end is attached to a strap 36, which extends upward over one of the side pieces of the trough and is connected to the sliding cover 2.

A spring 37, attached at one end to the cover 2 and bearing at its free end against the upper side of the plate 4, serves to move said plate upward during its return movement, and during this return movement the bar 35 will ride over the ratchet-wheel 34 without imparting motion thereto, because of the angle of the teeth of the rack-bar 35.

In the operation of canning salmon the fish is first split lengthwise into as many strips of suitable size as desired. Then the strips of the upper portion or back of the fish are separated from the strips cut from the lower portion of the fish, so that the proper proportions for mixing of the meat in the can will be had. The strips of fish will be tapered or smaller at one end than the other, and it is designed that the whole mass shall be fed through the machine in a column of equal size throughout its entire length. Therefore I place a layer of strips on the apron with the larger ends toward the machine and then upon this layer place another layer with the smaller ends toward the machine, and this is continued with the strips taken from the back of the fish until the desired thickness is obtained. Then the strips taken from the lower portion of the fish are placed in a like manner on the layers first placed on the apron until the proper depth is obtained. When the end of the column of fish enters the trough 1, the plunger-teeth are to be forced downward into the meat. Then by drawing them, with the sliding cover toward the outlet-end of the machine, the strips of fish will be carried along.

Before the return motion of the plunger the handle is to be elevated to permit the spring 37 to move the plunger-teeth upward. The operation of feeding the fish forward, as above described, is to be continued until the end of the column is ready to enter a can. At this time the cutter 22 is to be moved downward to trim off the uneven ends of the column protruding from the mouth of the forming-tube.

After cleaning and replacing the can-clamping device it is to be moved to its downward position and the can clamped therein. After this the cutter 22 is to be raised and the feeding operation, by means of the plunger, continued until the meat reaches the bottom of the can, when the knife is to be forced downward to cut off the material close to the open end of the can, after which the can is to be removed and the cover soldered thereon.

By this machine it will be seen that cans can be quickly filled, and the several cans will have uniform proportions of the fish and practically the same weight, and, further, by using this machine the meat is not subject to excessive handling by different people. Therefore the canned meat will be of a very superior and first-class quality.

Having thus fully described my invention, I claim as new and desire to secure by Letters Patent—

1. A canning-machine, comprising a trough, a can-holder at the outlet end of the trough, a cover movable horizontally on the trough, a plunger having connection with the cover whereby it may move with the longitudinal movement of the cover and whereby it is movable vertically with relation to the cover, substantially as specified.

2. A canning-machine, comprising a trough, a forming-tube in said trough, a can-clamping device at the outlet end of said tube, the said clamping device being mounted to swing relatively to a base, a cutting-blade movable between the clamping device and the outlet end of the tube, a plunger consisting of teeth movable longitudinally of the trough and a sliding cover on the trough carrying the plunger and through which the teeth are movable vertically, substantially as specified.

3. A canning-machine, comprising a trough, a cover mounted to slide longitudinally of the trough, a plunger-carrier mounted to swing on the cover, a plunger consisting of teeth secured to said carrier and movable through openings in the cover, a handle for moving the plunger longitudinally and serving to force the teeth into the trough, a can-holding device at the outlet end of the machine, and a knife movable between said can-holding device at the outlet end of the machine, substantially as specified.

4. A canning-machine, comprising a trough, a cover mounted to slide longitudinally thereon, a plunger movable with the sliding cover, an endless apron at the inlet end of the trough, a ratchet-wheel on the shaft of one of the endless apron-rollers, a rack-bar engaging with said wheel, and a connection between the rack-bar and the sliding cover.

5. A canning-machine, comprising a trough, a cover mounted to slide longitudinally of the trough, a forming-tube in the trough, a can-holding device at the outlet end of the tube, a knife for operating between the can-holding device and the end of the tube, a plunger movable with the sliding cover, an endless apron at the inlet end of the trough, a ratchet-wheel on the shaft of one of the endless-apron rollers, a rack-bar engaging with said wheel, and a connection between the rack-bar and the sliding cover, substantially as specified.

OREN RUBARTS.

Witnesses:
 IRA A. MILLER,
 JAMES K. SMITH.